United States Patent
Ali

(10) Patent No.: US 10,162,241 B2
(45) Date of Patent: Dec. 25, 2018

(54) ELECTROCHROMIC DISPLAY DEVICE

(71) Applicant: Saralon GmbH, Chemnitz (DE)

(72) Inventor: Moazzam Ali, Chemnitz (DE)

(73) Assignee: Saralon GmbH, Gebäude L (DE)

( * ) Notice: Subject to any disclaimer, the term of this patent is extended or adjusted under 35 U.S.C. 154(b) by 51 days.

(21) Appl. No.: 15/390,782

(22) Filed: Dec. 27, 2016

(65) Prior Publication Data
US 2017/0108754 A1  Apr. 20, 2017

Related U.S. Application Data

(63) Continuation-in-part of application No. PCT/EP2015/063980, filed on Jun. 22, 2015.

(30) Foreign Application Priority Data

Jul. 1, 2014 (GB) .................................. 1411692.5

(51) Int. Cl.
*G02F 1/153* (2006.01)
*G02F 1/15* (2006.01)
(Continued)

(52) U.S. Cl.
CPC ........ *G02F 1/1533* (2013.01); *G02F 1/13338* (2013.01); *G02F 1/153* (2013.01);
(Continued)

(58) Field of Classification Search
CPC ........... G02F 1/1523; G02F 2001/1557; G02F 1/1533; G02F 1/13338; G02F 1/155; G02F 1/163; G02F 2001/1536; G02F 2001/1515
(Continued)

(56) References Cited

U.S. PATENT DOCUMENTS

| | | |
|---|---|---|
| 4,257,683 A | 3/1981 | Kuwagaki et al. |
| 2007/0182705 A1 | 8/2007 | Leyland et al. |

(Continued)

FOREIGN PATENT DOCUMENTS

| | | |
|---|---|---|
| JP | 08075655 A | 3/1996 |
| WO | 98/57227 | 12/1998 |
| WO | 2013/068185 A1 | 5/2013 |

OTHER PUBLICATIONS

D. Lin, C. Chang, F. Huang, L. Cheng, "Effect of salt additive on the formation of micro porous poly(vinylidene fluoride) membranes by phase inversion from LiClOJWater/DMF/PVDF system," Polymer 44 (2003) 413-422.

*Primary Examiner* — William R Alexander
*Assistant Examiner* — Henry A Duong
(74) *Attorney, Agent, or Firm* — 24IP Law Group; Timothy Dewitt

(57) ABSTRACT

An electrochromic display devices to display a desired image is taught. The display includes a transparent substrate, deposited with a first electrically conducting layer. At least one electrochromic layer is provided on the first electrically conducting layer. An ionically conducting layer is provided on the electrochromic layer and a piezoresistive layer is provided on the second electrically conducting layer. A third electrically conducting layer is provided on the piezoresistive layer. The electrochromic display device displays image in two different modes. In the first mode, an electrical potential is applied across the first and second electrically conducting layer. In the second mode, an electrical potential is applied across the first and the third electrically conducting layer and simultaneously a pressure is applied on the surface.

10 Claims, 3 Drawing Sheets

(51) Int. Cl.
  *G02F 1/1333* (2006.01)
  *G02F 1/155* (2006.01)
  *G02F 1/163* (2006.01)

(52) U.S. Cl.
  CPC ............ *G02F 1/155* (2013.01); *G02F 1/1525*
    (2013.01); *G02F 1/163* (2013.01); *G02F*
    *2001/133394* (2013.01); *G02F 2001/1515*
    (2013.01); *G02F 2001/1536* (2013.01); *G02F*
    *2001/1557* (2013.01)

(58) Field of Classification Search
  USPC .......................................................... 359/271
  See application file for complete search history.

(56) References Cited

U.S. PATENT DOCUMENTS

| | | | |
|---|---|---|---|
| 2011/0199666 A1* | 8/2011 | Chun ...................... | G02F 1/161 359/269 |
| 2012/0127554 A1* | 5/2012 | Higuchi ............... | C07D 213/22 359/270 |
| 2015/0015932 A1* | 1/2015 | Telfer ..................... | G02B 26/00 359/296 |

* cited by examiner

US 10,162,241 B2

ELECTROCHROMIC DISPLAY DEVICE

CROSS-RELATION TO OTHER APPLICATIONS

This application is a continuation-in-part of International Patent Application No PCT/EP2015/063980 "Electrochromic Display Device" filed on Jun. 22, 2015, which claims priority to and benefit of British Patent Application No. GB 1411692.5 filed on Jul. 1, 2014. The disclosures of both patent applications are incorporated herein by reference.

BACKGROUND OF THE INVENTION

Field of the Invention

The present disclosure relates to electrochromic display devices, and in one aspect of the disclosure to colour changing electrical devices on which the display colour is changed from one colour to another colour by simultaneously applying an electrical potential across the electrodes and pressure over the device.

Brief Description of the Related Art

Electrochromic display devices are known in the art and include electrochromic materials, which change their optical properties, such as colouration, when an electrical potential is applied to the electrochromic display device. The change in colour can be used to display images through the electrochromic display devices. In one kind of electrochromic display device, an electrochromic layer is in direct contact with one side of an electrolyte layer and the other side of the electrolyte layer is in direct contact with a back electrically conducting layer. If the electrochromic layer is also electrically conducting, then application of an electric potential across the electrochromic layer and the back electrically conducting layer gives rise to a change in colour of the electrochromic layer. If the electrochromic layer is electrically insulating, then a front electrically conducting layer is placed on the front side of the electrochromic layer. The front electrically conducting layer can be completely or partially optically transparent. The application of an electrical potential across the front electrically conducting layer and the back electrically conducting layer gives rise to a change in colour in the electrochromic layer. These kinds of electrochromic devices are good for colour changing windows. These prior art electrochromic display devices cannot display two-dimensional images. In this context, the term "two dimensional images" includes any message, text, figures, designs etc. displayed as an image on the surface of the electrochromic device.

FIG. 1A, FIG. 1B, FIG. 1C and FIG. 1D illustrate cross-sectional views of prior art electrochromic display devices for the display of two-dimensional images. FIG. 1A illustrates one of the simplest prior art electrochromic display device 100. The electrochromic display device 100 includes a front transparent and electrically insulating substrate 102. On the substrate 102 is provided a first electrically conducting layer 104, which can be completely or partially transparent. One or more electrochromic layers 106 are provided on the first electrically conducting layer 104. An electrolyte layer 108 is proved on the one or more electrochromic layers 106. The electrolyte layer 108 can be in solid or semi-solid form. The second electrically conducting layer 110 is in direct contact with the electrolyte layer 108. The second electrically conducting layer 110 can be in the form of a two dimensional image. When an electrical potential is applied across the first electrically conducting layer 104 and the second electrically conducting layer 110, the electrochromic layer 106 changes its colour only in those areas, which overlap with the second electrically conducting layer 110.

The images produced with this kind of electrochromic display device are not sharp, as the edges of the image are generally blurred. When an electrical potential is applied between the first electrically conducting layer 104 and the second electrically conducting layer 110, ions inside the electrolyte layer 108 are supposed to move only in those regions of the electrolyte layer 108 which overlap with the second conducting layer 110. In reality, the ions inside the electrolyte layer 108 diffuse also into nearby regions, as shown by a region 109 inside the electrolyte layer 108. The region 109 is shown by the broken lines in FIG. 1. This diffusion causes a blurred image to be displayed by the electrochromic display device 100.

The display of this kind of electrochromic display device 100 will appear of uniform colour in the off-state. The off-state is the state in which no electrical potential is applied across the electrochromic display device 100 and hence no colour change has taken place in the electrochromic layer(s) 106. In the off-state the pattern of the second electrically conducting layer 110 will not be visible when viewed from the side of the substrate 102, when the first electrically conducting layer 104, the electrochromic layer(s) 106 and the electrolyte layer 108 together provide enough opacity. Typically, the total thickness of the first electrically conducting layer 104 and the electrochromic layer 106 is between 50 nm to 1000 nm and this makes the first electrically conducting layer 104 and the electrochromic layer 106 together partially transparent. In order to provide the display of a desired colour in the off-state, pigments are mixed inside the electrolyte layer 108. These pigments provide opacity to the electrochromic display device.

Another prior art electrochromic display device is illustrated in FIG. 1B. In this case, the second electrically conducting layer 110 is not in the form of an image. Instead, a pattern defining layer 112, which is electronically and ionically insulating and is in the form of a two dimensional image, is arranged on the second electrically conducting layer 110. The pattern-defining layer 112 comprises one or more openings 113. The pattern defining layer 112 and the second electrically conducting layer 110 are in direct contact with each other. The second electrically conducting layer 110 and the electrolyte layer 108 are in direct contact to each other only through the openings 113. In this electrochromic display device also the image displayed by the electrochromic layer is not sharp, as the region 109 with the ionic movements inside the electrolyte layer 108 is bigger than the region defined by the pattern.

When viewed from the direction of the substrate 102 during the off-state, the display of the electrochromic display device will appear as having a uniform colour, i.e. the pattern defined by the pattern defining layer 112 will not be visible, when the layer first electrically conducting layer 104, the electrochromic layer(s) 106 and the electrolyte layer 108 together provide enough opacity. The effect of blurring can be minimized, but cannot be eliminated completely even if the pattern defining layer 112 is placed inside the electrolyte layer 108, as illustrated in FIG. 1C. In the example of FIG. 1C, the pattern-defining layer 112 will not be visible when viewed from the direction of the substrate 102 in the off-state.

In order to eliminate the blurring effect completely, the pattern defining layer 112, which is electronically and ionically insulating, is placed in direct contact with the electrochromic layer(s) 106, as illustrated in FIG. 1D. In this case, the electrochromic layer(s) 106 and the electrolyte layer 108 are in contact with each other only through the openings 113 in the pattern-defining layer 112. In this electrochromic display device, the pattern will be partially visible in the off state. By using an appropriate combination of binders and pigments in the pattern-defining layer 112 and in the electrolyte 108, similar optical appearances in these two layers can be achieved. The blurring cannot be eliminated completely. Therefore, there exists a trade-off between image quality and off-state colour homogeneity.

The electrochromic display device can be connected to a power supply through necessary electronic components. Typically, a switch is required to switch on the display. The switch can be a sensor. In certain applications, a pressure-activated switch is required. For example, pressing the pressure sensing switch will activated the display. In the prior art electrochromic display devices shown in FIG. 1, a separate pressure sensor is needed which can be placed between the display and the power supply. If a pressure sensor is used that is already an integral part of the display, will make the production of the device simpler and also very cost-effective.

SUMMARY OF THE INVENTION

The present invention relates to an electrochromic display devices to display an image. The electrochromic display comprises a transparent substrate, which comprises a frontside and a backside. From the front side, a viewer can see the image displayed by the electrochromic display device. A first electrically conducting layer is provided on the backside of the transparent substrate. The first electrically conducting layer is completely or partially transparent. At least one electrochromic layer is provided on the first electrically conducting layer. An ionically conducting layer is provided on the electrochromic layer, which is substantially ionic conducting in the perpendicular direction and negligibly ionic conducting in the parallel direction to the plane of the ionically conducting layer. A pattern-defining layer, which is ionically and electronically insulating, is provided on the ionically conducting layer with one or more openings. An electrolyte layer is provided on top of the pattern-defining layer in such a way that the electrolyte layer is in direct contact with the ionically conducting layer only through the one or more openings. A second electrically conducting layer is provided on the electrolyte layer.

In one aspect of the invention, a piezoresistive layer is provided on the second electrically conducting layer and in a further aspect of the invention a third electrically conducting layer is provided on the piezoresistive layer.

The electrochromic display device of this disclosure works in two different modes. In a first mode, an electrical potential is applied across the first electrically conducting layer and the second electrically conducting layer. This electric potential, causes movement of ions through the one or more openings of the pattern-defining layer. Hence, the electrochromic layer changes its colour only in those areas, which overlap with the one or more openings. In a second mode, an electrical potential is applied across the first electrically conducting layer and the third electrically conducting layer and simultaneously a pressure is applied on the electrochromic display device in the perpendicular direction of the plane of the device. The application of pressure on the electrochromic display device makes the piezoresistive layer electrically conducting, which causes movement of ions through the one or more openings of the pattern-defining layer. Hence, the electrochromic layer changes its colour only in those areas, which overlap with the one or more openings.

BRIEF DESCRIPTION OF THE DRAWINGS

For a more complete understanding of the present invention and the advantages thereof, reference is now made to the following description and the accompanying drawings, in which.

DETAILED DESCRIPTION OF THE PREFERRED EMBODIMENTS

The invention will now be described in detail. Drawings and examples are provided for better illustration of the invention. It will be understood that the embodiments and aspects of the invention described herein are only examples and do not limit the protector's scope of the claims in any way. The invention is defined by the claims and their equivalents. It will be understood that features of one aspect or embodiment of the invention can be combined with the feature of a different aspect or aspects and/or embodiments of the invention.

The present invention relates to an electrochromic display device. The electrochromic display device displays sharp images without blurring effect. The electrochromic display device in its off state, when the electrochromic layer has not changed its colour, appears to be of a uniform colour. The electrochromic display device displays the image in two different operation modes. In the first operation mode, an electrical potential is applied between a first electrically conducting layer and a second electrically conducting layer and the image is displayed. In the second operation mode, an electrical potential is applied between the first electrically conducting layer and a third electrically conducting layer and simultaneously a pressure is applied on the electrochromic display device in the perpendicular direction to the plane of the device.

Figure 1A:
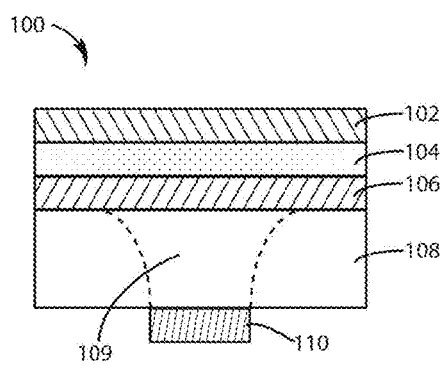
FIG. 1A is a cross-sectional view of a prior art electrochromic display device.
Figure 1B:
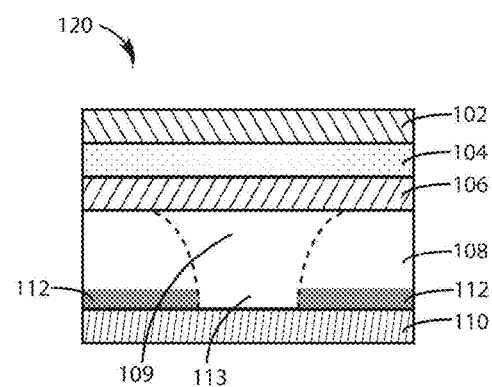
FIG. 1B is a cross-sectional view of another prior art electrochromic display device.
Figure 1C:
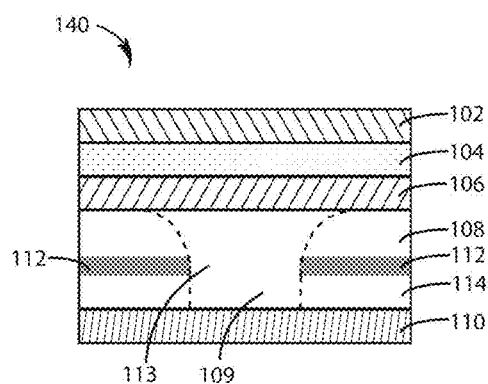
FIG. 1C is a cross-sectional view of another prior art electrochromic display device.
Figure 1D:
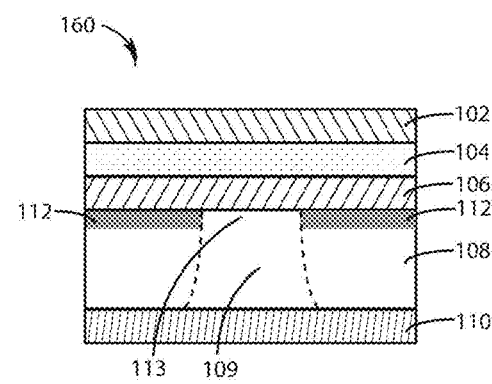
FIG. 1D is a cross-sectional view of another prior art electrochromic display device.
Figure 2A:
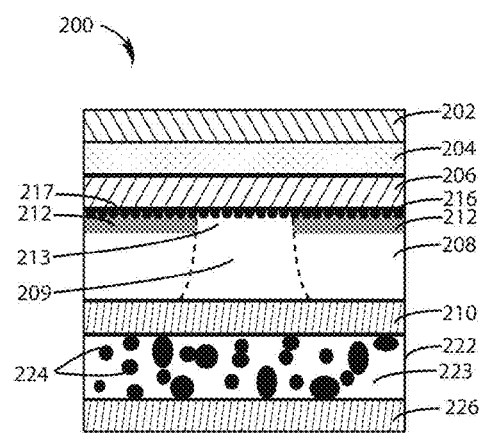
FIG. 2A is a cross-sectional view of an electrochromic display device, in accordance with an aspect of the present invention.

FIG. 2A illustrates a cross sectional view of an electrochemical display device 200. The electrochemical display device 200 includes a front optically transparent substrate 202. The optically transparent substrate 202 can be made of glass or plastic, which can be mechanically rigid or flexible. On one side of the optically transparent substrate 202 is provided a first electrically conducting layer 204. On the other side of the optically transparent substrate 202 is any viewer. The electrically conducting layer 204 can be completely or partially transparent. In one non-limiting example, the electrically conducting layer 204 is formed from a doped metal oxide layer. The doped metal oxide may be formed without limitation from indium tin oxide, aluminium zinc oxide or fluorine tin oxide. In another aspect, the electrically conducting layer 204 can be made of a very thin metal layer i.e. less than 50 nm, which is partially transparent. In another aspect, the electrically conducting layer 204 can be made of a metallic grid structure, which has completely transparent openings and non-transparent metallic structures. In another aspect, the electrically conducting layer 204 can be made of conducting polymers e.g. poly(3,4-ethylenedioxythiophene) polystyrene sulfonate (PEDOT:PSS).

On top of the electrically conducting layer 204 is provided one or more electrochromic layers 206. Without limitation, inorganic or organic electrochromic materials may be used for the electrochromic layer 206. Examples of suitable ones of the inorganic electrochromic materials include, but are not limited to, tungsten oxide, molybdenum oxide, iridium oxide, titanium oxide etc. Examples of suitable ones of the organic electrochromic materials include, but are not limited to, viologen, rare earth phthalocyanine, styryl etc. Examples of suitable ones of the organic polymeric electrochromic materials include, but are not limited to, poly(pyrrole), poly(thiophene), poly(aniline), a derivative thereof, etc. A mixture of two or more electrochromic materials can be used as the electrochromic layer 206.

On top of the electrochromic layer 206 is provided an ionically conducting layer 216. The ionically conducting layer 216 is substantially ionically conducting in a perpendicular direction to the plane of the ionically conducting layer 216 and substantially ionically insulating in the parallel direction to the plane of the ionically conducting layer 216. The ionically conducting layer 216 may or may not be electronically conducting. The ionically insulating nature of the ionically conducting layer 216 in the parallel direction of the plane hinders the movements of ions along the plane, when an electric potential is applied. Hence, this creates sharp images. The ionically conducting layer includes pigments, which provide a homogenous background colour to the display 200. Therefore, when the display is viewed from the substrate side, it shows a uniform colour in the off state. The thickness of the ionically conducting layer 216 is, but not limited to, between 1 micrometer to 100 micrometer. The ionically conducting layer is formed of, but is not limited to, an ionic conducting polymer, pigments and binders. The ionic conducting polymer can be polyacrylic acid, polyvinyl alcohol, polyethylene oxide etc., and provides ionic conductivity to the ionic conducting layer 216. The pigments can be made of any inorganic or organic material. The pigments of a desired colour in the ionic conducting layer 216 provide the display with a desired homogenous colour when the display is in the off-state.

The ionically conducting layer 216 is provided on top of the electrochromic layer 206 in the form of a plurality of segments 217. The projected area of one of the segments 217 on the electrochromic layer 206 is between 0.001 mm$^2$ to 1 mm$^2$. The dimension of the segment 217 is selected in such a way that the projected area of a single segment 217 on the electrochromic layer 206 is not easily detected by a normal human eye.

Figure 3:
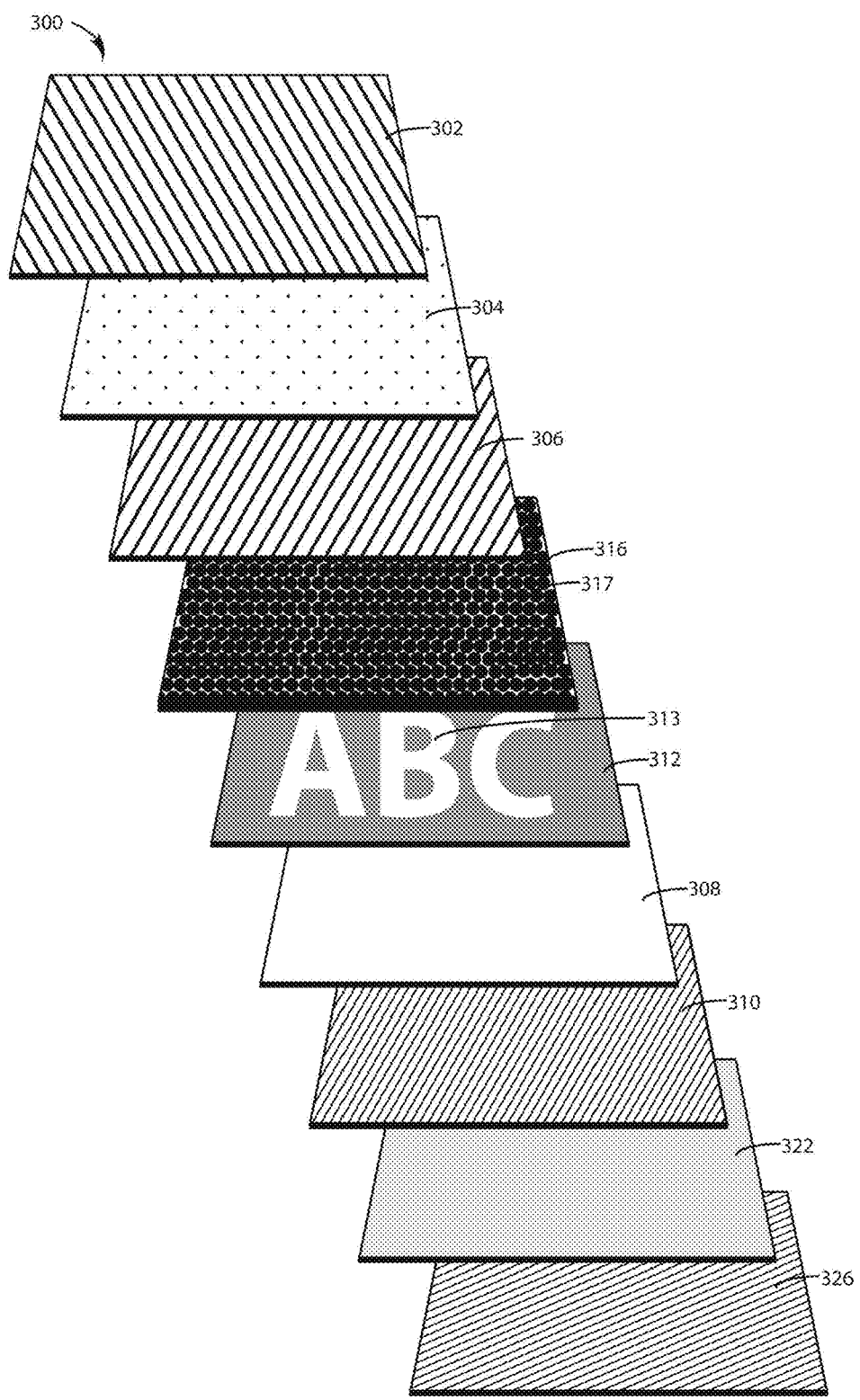
FIG. 3 is an exploded view of an electrochromic display device, in accordance with an aspect of the present invention.

The segments 217/317 of the ionically conducting layer 216/316 can be clearly seen in an exploded view of the electrochromic display device in FIG. 3. Each of the segments 317 of the ionically conducting layer 316 are separated from its surrounding segments 317 in such a way that there are no or very small contacts between two neighbouring segments. Completely separated or partially separated segments 216 from each other provide completely or partially ionic insulation, respectively, in the parallel direction of the plane. The total projected area of all the segments 216 on the electrochromic layer covers at least 50% area of the electrochromic layer 206. On top of the ionically conducting layer 216 is provided a pattern-defining layer 212, which is electrically and ionically insulating. The pattern-defining layer 212 includes one or more openings 213.

Figure 2B:
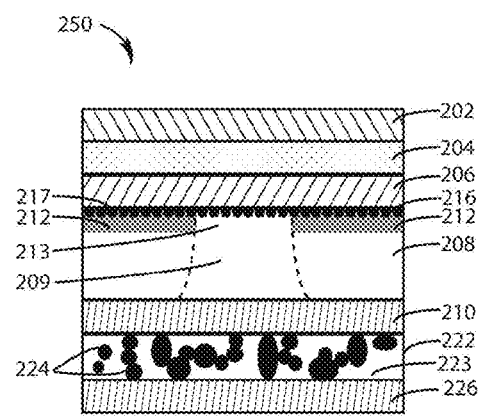
FIG. 2B is a cross-sectional view of an electrochromic display device with an applied pressure on it, in accordance with an aspect of the present invention.

On top of the pattern defining layer 212 is provided an electrolyte layer 208. The electrolyte in the electrolyte layer 208 can be in solid or semi-solid form. The electrolyte comprises, but is not limited to, one or more ionic conducting polymers and one or more salts. The ionic conducting polymer can be, but is not limited to, polyacrylic acid, polyvinyl alcohol, polyethylene oxide etc. The one or more salts can be selected from lithium salts. The electrolyte layer 208 is in direct contact with the ionically conducting layer 216 through the one or more openings 213 of pattern defining layer 212. On top of the electrolyte layer 208 is provided a second electrically conducting layer 210. In a one aspect, the second electrically conducting layer 210 is made of carbon. On top of the second electrically conducting layer 210 is provided a piezoresistive layer 222. The piezoresistive layer 222 is made of, but not limited to, a dispersion of electrically conducting particles 224 inside an elastic polymer matrix 223. The electrically conducting particles 224 can be of carbon, metal etc. In one aspect the elastic polymer matrix 223 is made of polydimethylsiloxane. The conducting particles are dispersed in the elastic polymer matrix 223 in such a way that inside the piezoresistive layer 222 there is no or only partial contact between two of the electrically conducting particles 224, as illustrated in FIG. 2A. This makes the piezoresistive layer 222 electrically insulating when there is no pressure applied on the piezoresistive layer 222. When a pressure is applied on the piezoresistive layer 222, the electrically conducting particles 224 come close to each other and create electrical connections and hence the piezoresistive layer 222 becomes at least partially electrically conducting, as illustrated in FIG. 2B. After removal of the pressure, the electrically conducting particles 224 return back to their original positions and the piezoresistive layer 222 returns back to its insulating nature. On top of the piezoresistive layer 222 is provided a third electrically conducting layer 226.

As noted above, the electrochromic display device 200 of this disclosure displays the image in two different operating conditions. In the first operating condition, an electrical potential is applied between the first electrically conducting layer 204 and the second electrically conducting layer 210 and the image is displayed. In the second operating condition, an electrical potential is applied between the first electrically conducting layer 204 and the third electrically conducting layer 210 and simultaneously a pressure is applied on the electrochromic display device 200 in the perpendicular direction of the plane of the electrochromic display device 200. In the second operating condition, the applied pressure makes the piezoresistive layer 222 electrically conducting and hence the display will be on, as illustrated in FIG. 2B.

FIG. 3 illustrates an exploded view of the electrochromic display device 300. The electrochromic display device 300 includes a front optically transparent substrate 302. On one side of the optically transparent substrate 302 is provided a first electrically conducting layer 304. On the other side of the optically transparent substrate 302 is any type of suitable viewer. On the first electrically conducting layer 304 is provided one or more electrochromic layers 306. An ionically conducting layer 316 is provided on the electrochromic layer 306. The ionically conducting layer 316 is made of a plurality of segments 317, which are partially or completely separated from the surrounding segments 317. This separation of the segments 317 makes the ionically conducting layer 316 ionic conducting in perpendicular direction to the plane of the layer and ionic insulating in the parallel direction of the layer. A pattern-defining layer 312 is provided on top of the ionically conducting layer 316, which includes one of more openings 313. The colour of the electrochromic layer 306 changes its colour only in those areas, which overlap with the openings 317. An electrolyte layer 308 is provided on the pattern-defining layer 312 in such a way that the electrolyte layer is in direct contact with the ionically conducting layer 316 only through the openings 313. A second electrically conducting layer 310 is provided on the electrolyte layer 308. A piezoresistive layer 322 is provided on the second electrically conducting layer 310. A third electrically conducting layer 326 is provided on the piezoresistive layer 322.

The present invention also relates to methods to produce electrochromic display devices 200 or 300. At least one layer of the electrochromic display device 200, 300 is deposited by a printing method. Here, the term "printing methods" implies conventional printing techniques used for the deposition of layers from inks i.e. screen printing, offset printing, gravure printing, inkjet printing etc.

The first electrically conducting layer 204, 304 is deposited on a transparent substrate 202, 302 by using either a printing method or a vacuum deposition technology. Examples of vacuum deposition technology include, but are not limited to, chemical vapour deposition, physical vapour deposition, sputtering, laser ablation etc. In one aspect of the disclosure, the first electrically conducting layer 204, 304 is a doped metal oxide layer, which is deposited by a vacuum deposition technology. The doped metal oxide may be indium tin oxide, aluminium zinc oxide or fluorine tin oxide. In another aspect, the first electrically conducting layer 204, 304 can be made of a very thin metal layer, deposited by a vacuum deposition technology. The thin metal layer can have a thickness of less than 50 nm and is partially transparent. In another aspect, the electrically conducting layer 204, 304 can be made of a metallic grid structure, which is deposited by a printing method by using ink. The metallic grid has a plurality of completely transparent openings and non-transparent metallic structures. The ink used for the metallic grid structure can be commercially available silver ink e.g. DuPont 5028 silver ink. In another aspect, the electrically conducting layer 204, 304 can be made of conducting polymers e.g. poly(3,4-ethylenedioxythiophene):polystyrene sulfonate (PEDOT:PSS), which can be deposited by a printing method. The ink used can be, but is not limited to, a commercially available PEDOT:PSS ink e.g. Clevios™ PEDOT:PSS SV3.

The one or more electrochemically active layers 206, 306 are subsequently printed on top of the first electrically conducting layer 204, 304, also using inks. In an aspect, the electrochromic layer 206, 306 can be made from PEDOT:PSS. In another aspect, the first electrically conducting layer 204 and the electrochromic layer 206 are made of the same material, which is electrically conducting as well as electrochromically active. PEDOT:PSS is an example of such a material, which can be deposited by a printing method.

On top of the electrochromic layer 206 an ionically conducting layer 216 is printed by using an ionically conducting ink. The ionically conducting ink comprises ionic conducting polymers, pigments and binders. The ionically conducting ink further includes additives to improve its surface adhesion, printing properties etc. The ionically conducting layer 216 is printed in the form of a plurality of tinny segments 216, which are partially or completely separated from each other.

A pattern-defining layer 212 is printed on top of the ionically conducting layer 216 by using an insulating ink. The pattern-defining layer 212 has one or more openings 213. The insulating ink for the pattern-defining layer 212 includes mainly electronically and ionically insulating materials present in an appropriate dispersing medium. For example, poly(methyl methacrylate) dissolved in toluene can be used as an ink for the pattern-defining layer 212. The ink can also include appropriate additives. The electrolyte layer 208 is printed on the pattern defining layer 212 using an electrolyte ink in such a way that the dried electrolyte layer 208 makes direct contact with the ionically conducting layer 212 only through the openings 213 on the pattern defining layer 212.

The electrolyte ink comprises, but is not limited to, ionic conducting polymers and salts in an appropriate dispersing medium. The electrolyte ink may also include pigments and additives. After thermal drying or after radiation curing, the electrolyte layer 208 is in a solid form. The second electrically conducting layer 210 is provided on the electrolyte layer 208 by printing method and by using a conducting ink e.g. DuPont 5028 silver ink or Conducting Compound C-20 carbon ink.

On the second electrically conducting layer 210 is printed the piezoresistive layer 222 by using a piezoresistive ink. The piezoresistive ink is, but not limited to, a dispersion of electrically conducting particles 224 and elastic polymers in an appropriate dispersion medium. The conducting particles can be of carbon, metal etc. In a preferred embodiment the elastic polymer matrix is made of polydimethylsiloxane. In the dried piezoresistive layer, the conducting particles are dispersed in the polymer matrix in such a way that there is no or partial contact between two particles. The third electrically conducting layer 226 is printed on the piezoresistive layer 222 using a conducting ink e.g. DuPont 5028 silver ink or Conducting Compound C-20 carbon ink. All the inks used for the electrochromic display device can be cured after printing either by thermal drying or by Ultra-violet exposure.

What is claims is:
1. An electrochromic display device, comprising:
   a transparent substrate;
   a first electrically conducting layer provided on the transparent substrate;
   at least one electrochromic layer provided on the first electrically conducting layer;
   an ionically conducting layer provided on the electrochromic layer, the ionically conducting layer comprising an ionic conducting polymer, wherein the ionically conducting layer is substantially ionically conducting in a perpendicular direction to the plane of the ionically conducting layer and substantially ionically insulating in a parallel direction to the plane of the ionically conducting layer;
   a pattern defining layer defined on the ionically conducting layer and defining an image, wherein the pattern defining layer is electronically and ionically insulating and comprises one or more of openings;
   an electrolyte layer provided on the pattern defining layer, wherein the electrolyte layer is in ionic contact with the ionically conducting layer through the one or more openings of the pattern defining layer; and a second electrically conducting layer provided on the electrolyte layer such that applying an electrical potential across the first electrically conducting layer and the second electrically conducting layer causes display of the image defined by the pattern defining layer a piezoresistive layer provided on the second electrically conducting layer; and a third electrically conducting layer provided on the piezoresistive layer, such that simultaneously applying an electrical potential across the first electrically conducting layer and the third electrically conducting layer and a pressure on the electrochromic display device in the perpendicular direction of the plane of the electrochromic display device displays the image defined by the pattern defining layer.

2. The electrochromic display device according to claim 1, wherein the first electrically conducting layer comprises transparent and conducting metal oxide.

3. The electrochromic display device according to claim 1, wherein the first electrically conducting layer comprises transparent and conducting organic polymeric materials.

4. The electrochromic display device according to claim 1, wherein the first electrically conducting layer and the electrochromic layer are made of a single layer, which is at least one of conducting and electrochromically active organic polymer.

5. The electrochromic display device according to claim 1, wherein the ionically conducting layer comprises a plurality of segments, the plurality of segments being partially separated from each other.

6. The electrochromic display device according to claim 1, wherein the ionically conducting layer has a thickness of between 1 micrometer to 100 micrometer.

7. The electrochromic display device according to claim 5, wherein a projected area of at least one of the plurality of segments on the electrochromic layer is between 0.001 $mm^2$ to 1 $mm^2$.

8. The electrochromic display device according to claim 5, wherein a total projected area of the plurality of segments on the electrochromic layer covers at least 50% area of the electrochromic layer.

9. The electrochromic display device according to claim 1, wherein the ionically conducting layer comprises a plurality of pigments dispersed in at least one polymer, wherein the at least polymer is ionically conducting.

10. The electrochromic display device according to claim 1, wherein the piezoresistive layer comprises a plurality of conducting particles dispersed in an electrically insulating elastic polymer matrix.

* * * * *